H. H. STEELE.
TYPE WRITING MACHINE.
APPLICATION FILED MAR. 2, 1910.
1,030,029.
Patented June 18, 1912.
4 SHEETS—SHEET 1.
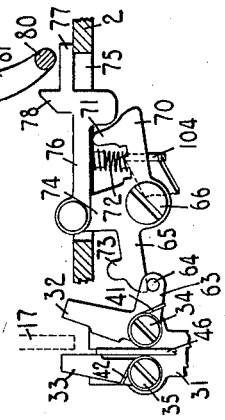
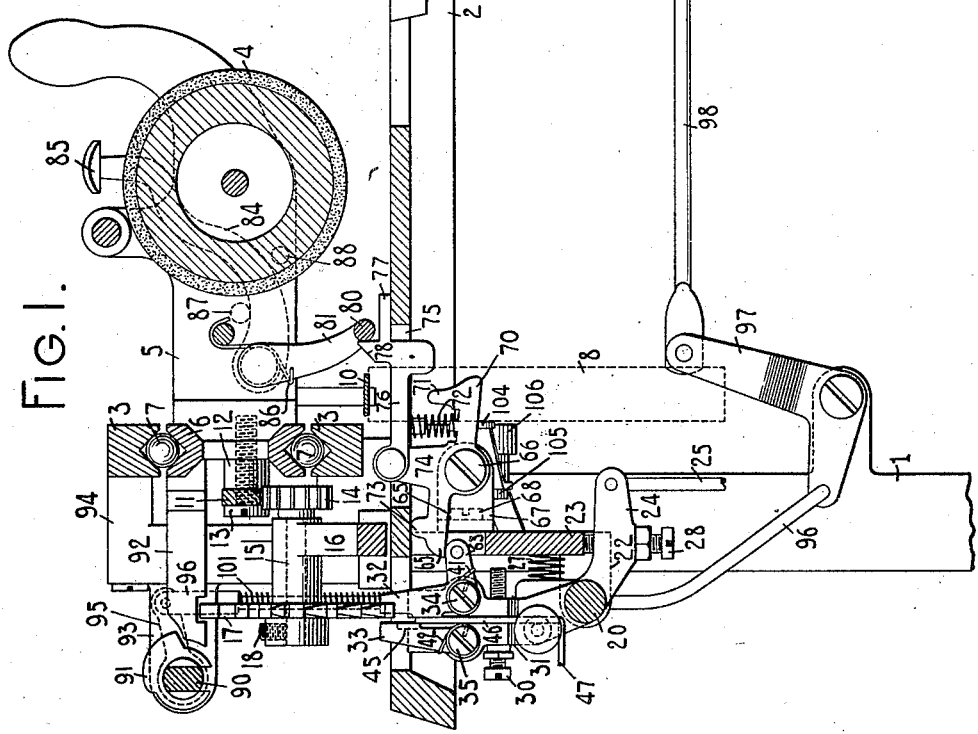
WITNESSES:
E. M. Wells
R. H. Strother
INVENTOR:
Herbert H. Steele
By Jacob Felbel
His ATTORNEY

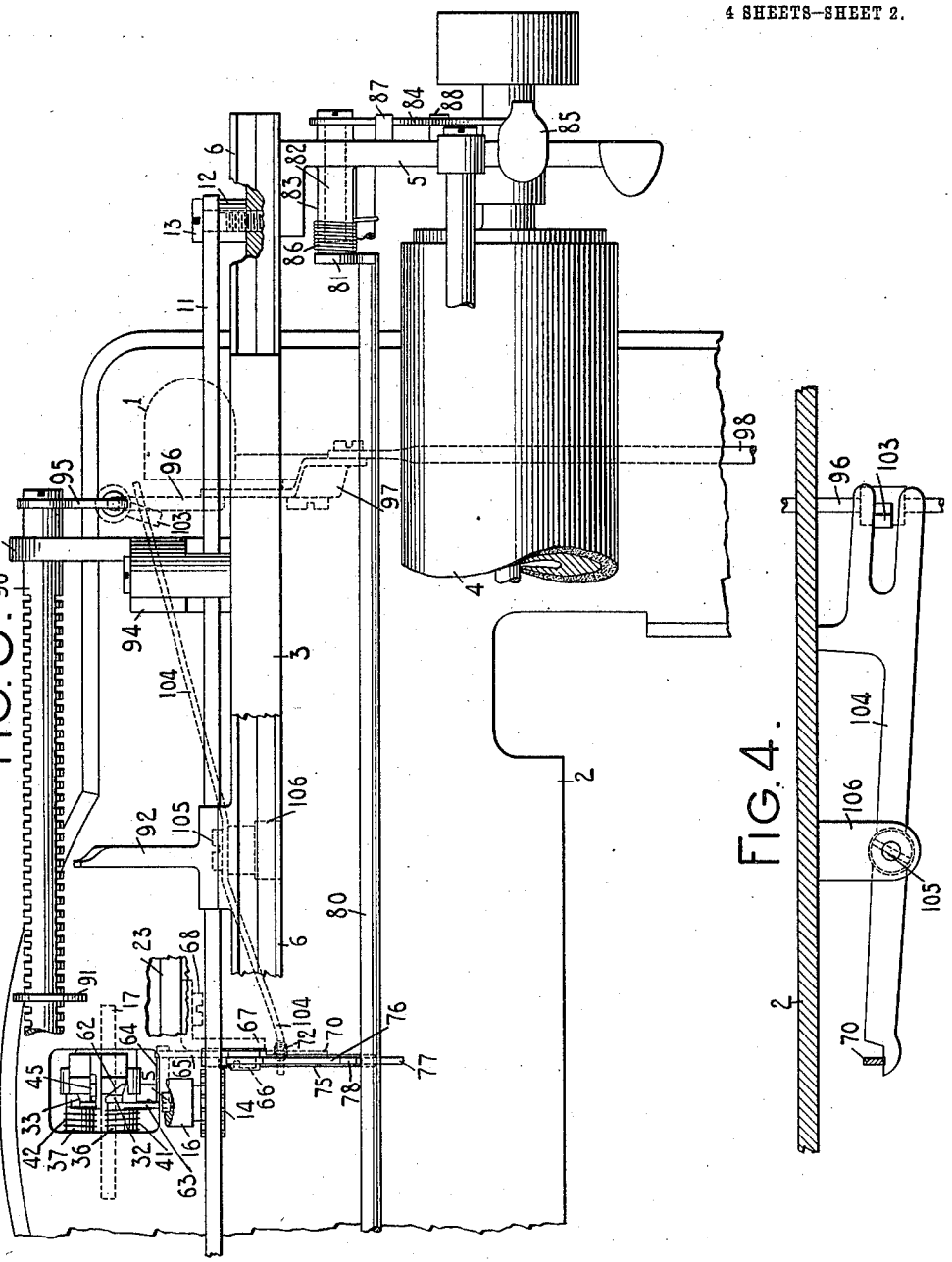

H. H. STEELE.
TYPE WRITING MACHINE.
APPLICATION FILED MAR. 2, 1910.
1,030,029.
Patented June 18, 1912.
4 SHEETS—SHEET 3.
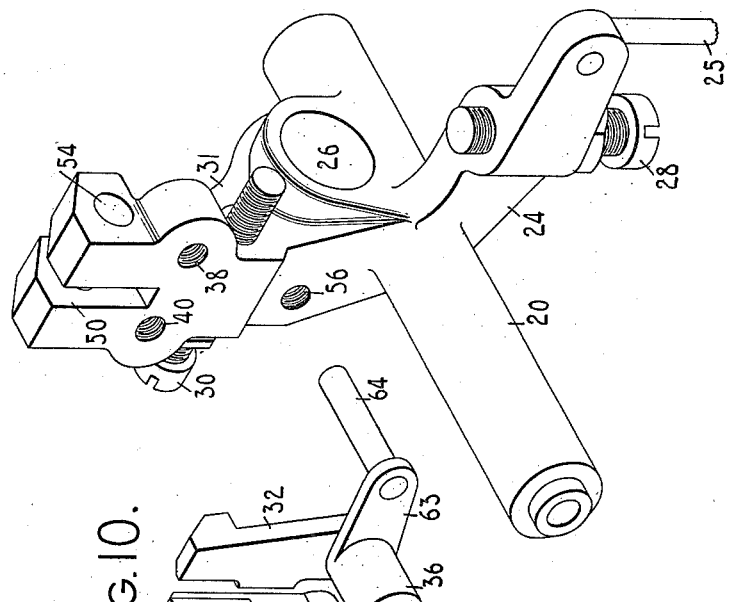
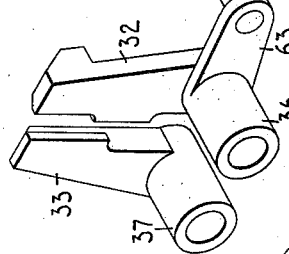
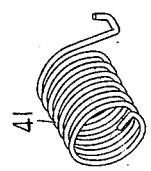
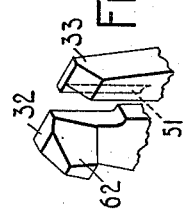
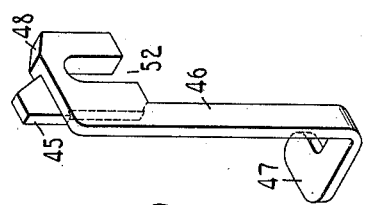
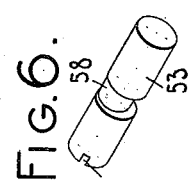
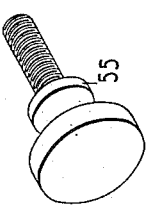
WITNESSES:
E. M. Wells.
R. H. Strother.
INVENTOR:
Herbert H. Steele
By Jacob Felbel
HIS ATTORNEY
COLUMBIA PLANOGRAPH CO., WASHINGTON, D. C.

H. H. STEELE.
TYPE WRITING MACHINE.
APPLICATION FILED MAR. 2, 1910.
1,030,029.
Patented June 18, 1912.
4 SHEETS—SHEET 4.
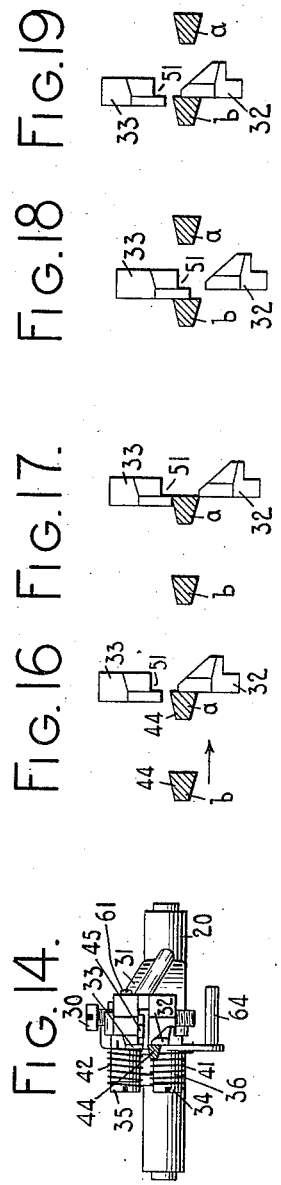
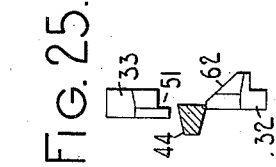
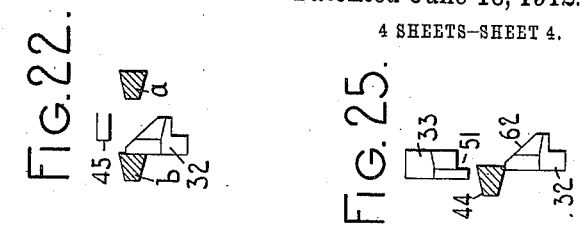
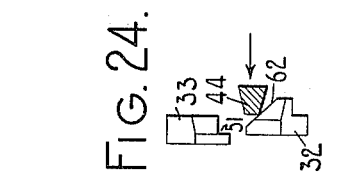
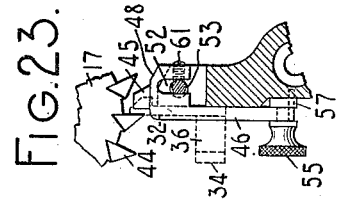
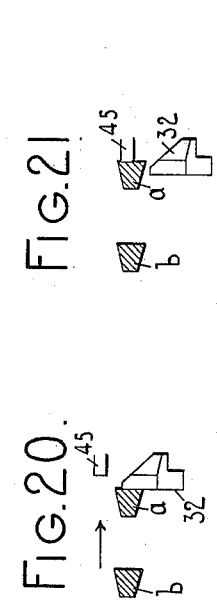
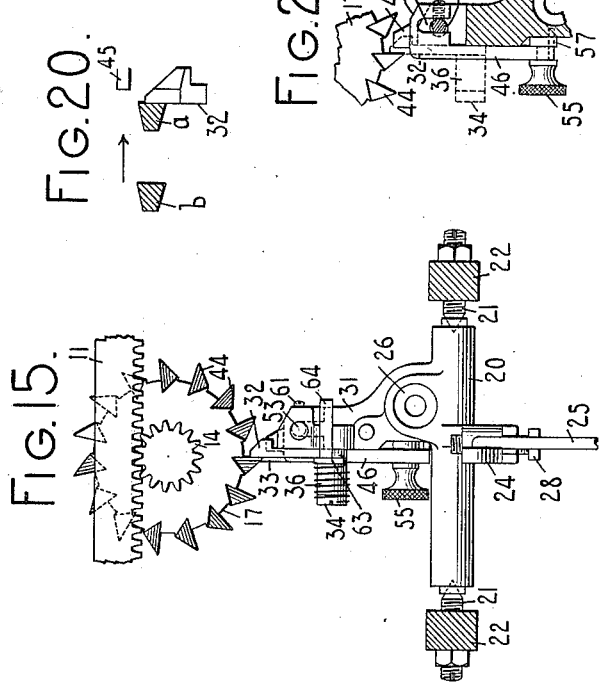
WITNESSES:
E. M. Wells
R. H. Strother.
INVENTOR:
Herbert H. Steele
By Jacob Felbel
HIS ATTORNEY

UNITED STATES PATENT OFFICE.

HERBERT H. STEELE, OF MARCELLUS, NEW YORK, ASSIGNOR TO THE MONARCH TYPE-WRITER COMPANY, OF SYRACUSE, NEW YORK, A CORPORATION OF NEW YORK.

TYPE-WRITING MACHINE.

1,030,029. Specification of Letters Patent. Patented June 18, 1912.

Application filed March 2, 1910. Serial No. 546,943.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

My invention relates to typewriting machines and it has for its principal object to improve, in several respects, the carriage feed mechanism of such machines.

In typewriters as usually manufactured the carriage is propelled by a driving spring, and it is controlled by escapement mechanism which usually comprises an escapement wheel which is geared to the carriage by a rack and pinion. The rack is usually mounted on the carriage in such a way that it can be lifted out of engagement with the pinion, and the escapement wheel is usually connected with the pinion by a pawl and ratchet to admit of the carriage being drawn to the right to begin a new line without turning the escapement wheel. There are certain disadvantages about this lifting rack and this pawl and ratchet connection, arising out of the practical impossibility of cutting toothed members with perfect accuracy. When the rack is raised out of engagement with the pinion and the carriage is moved, the rack when restored to engagement does not have a given rack tooth engaging the same tooth of the pinion as before. The result is that if there is any inaccuracy in the teeth, the carriage is not brought to exactly the same point by a given rack tooth that it was before. Furthermore when the carriage is withdrawn to the right without raising the rack, the pawl does not engage the same tooth of the ratchet as before; and if there is any inaccuracy in the cutting of said ratchet the carriage is slightly misplaced. These inaccuracies are slight but they are sufficient to be noticeable under certain conditions; for example, if a letter has been written too faintly and the carriage is moved back to print the same character more distinctly these slight inaccuracies may prevent the second blow of the type from coming exactly on top of the first, with the result that the printing is not as clear and sharp as it should be. Inaccuracies in the cutting of the teeth of the escapement wheel itself are added to the other two because in the various changes of engagement it is not always the same escapement tooth that arrests the carriage at any given letter space position. Moreover, where the rack is pivoted to the carriage, so that it can be raised out of engagement with the pinion, there are certain conditions under which the rack is liable to jump out of engagement with the pinion when it is not intended to do so, such for example, as in back spacing operations. In order to prevent this jumping under ordinary conditions, the rack and pinion teeth are usually made, not of the standard configuration of gear teeth but in the form that is a sort of compromise between a gear tooth and a ratchet tooth, so that the engaging surfaces of the rack tooth and pinion tooth are radial of the pinion. This form of gearing has the advantages mentioned, but it is not perfect gearing.

It is one of the purposes of my invention to secure the rack rigidly to the carriage, to make said rack and pinion with gear teeth of standard outline, such for instance as involute or cycloidal teeth, and to mount the escapement wheel rigidly on the shaft of the pinion so that any given rack tooth always engages the same pinion tooth, and in any given letter space position the carriage is always held by the same tooth of the escapement wheel. With this arrangement the carriage is more accurately located at each letter space position thereof.

Another object of my invention is to provide suitable feed dogs for coöperation with an escapement wheel connected with the carriage in the manner described; to make the escapement instantly changeable from "reverse" to "ordinary," and vice versa; to provide for moving the carriage backward by making one of the feed dogs in the nature of a pawl that can snap over the teeth of the escapement wheel; to provide a suitable carriage release operated by a release key on the carriage and to provide suitable means for releasing the carriage, as when the tabulator is operated; to provide for changing the amount of drop when the escapement is set for ordinary operation; and to do all of these things in an escapement, the escapement wheel of which is permanently connected with the carriage in the manner above outlined. It will be understood, however, that some of my improvements are useful in machines in which the feed rack is not rigidly mounted and in which the escapement wheel is not rigid on its shaft. In fact some of my improvements can be used where the escapement rack is not a wheel at all.

My invention also contemplates certain general improvements in the escapement mechanism.

To the above ends my invention consists in certain features of construction and combinations and arrangements of parts, all of which will be fully set forth herein and particularly pointed out in the claims.

In the accompanying drawings, Figure 1 is a front to rear vertical sectional view of a typewriting machine having my invention embodied therein, only so much of said machine being shown as is necessary to an understanding of the invention. Fig. 2 is a fragmentary view, similar to a part of Fig. 1, but showing the release moved to operated position by the tabulator. Fig. 3 is a top plan view of the machine with parts broken away and parts omitted. Fig. 4 is a fragmentary rear elevation with parts in section and showing some of the connections to the tabulator. Fig. 5 is an isometric view showing the dog rocker with the movable parts removed. Figs. 6–12 are detached isometric views of the several parts that have been removed from the dog rocker in Fig. 5, each of said parts being viewed from the same point as in Fig. 5. Fig. 13 is an isometric view of the upper ends of the two movable feed dogs, before shown as viewed from a direction the opposite of that from which Figs. 5–12 are taken. Figs. 5–13 are on an enlarged scale. Fig. 14 is a top plan view of the dog rocker and the parts mounted thereon, one tooth of the escapement wheel being shown in section. Fig. 15 is a front elevation of the escapement mechanism, associated parts being shown in section or broken away. Figs. 16–19 are diagrammatic top views showing the operation of the escapement when set for a reverse feed, the parts being shown at different points in the key stroke in the different views. Figs. 20–22 are diagrammatic top views illustrating the operation of the escapement when set for ordinary feed, parts being shown in the different views at different points in the key stroke. Fig. 23 is a fragmentary rear elevation, partly in section, and showing the mounting of the rigid dog. Figs. 24 and 25 are diagrammatic top views illustrating the operation of the escapement when the carriage is drawn to the right without operating the release.

My invention is applicable or readily adaptable to typewriting machines generally. It is here shown applied to a machine in which the printing mechanism is relatively stationary, and in which the carriage carries the paper and moves across the machine. The invention is, in fact, shown applied to a Monarch front strike typewriter, though most of the mechanism of that machine is not shown, its construction being well-known in the art.

Of the main frame of the machine, the drawings show the corner posts 1 and the top plate 2, the latter supporting the stationary carriage rails 3. A paper roller or platen 4 is mounted in the carriage 5, which comprises end brackets projecting from a back bar 6 which is grooved on its upper and lower edges to coöperate with rollers 7 which run in the grooved rails 3. Said carriage is drawn across the machine by the usual spring drum 8 which is connected to the carriage by a strap 10. A rack bar 11 is mounted at the rear of the bar 6 and instead of being hinged to the carriage, as usual, said rack bar is rigidly mounted on said bar 6 by means of posts 12 and screws 13. Said rack bar meshes with a pinion 14, integral with or rigidly mounted on the forward end of a shaft 15, which is journaled in a bracket 16 mounted on the top plate 2. The escapement rack or wheel 17 is mounted on the rear end of said shaft, to which it is rigidly secured by a set screw 18 threaded through the hub of the wheel and engaging the shaft. A dog rocker 20 is pivoted as usual on tapered screws 21 threaded through ears 22 projecting toward the back of the machine from a bracket 23 which is secured to the underside of the top plate 2. Except at its upper part where the feed dogs are mounted, this dog rocker, its mounting and its connections are or may be all of the usual construction heretofore employed in the Monarch machine. Said dog rocker has the usual forwardly directed arm 24 to which is pivoted the upper end of a link 25, the lower end of which is connected with the frame of the universal bar, which universal bar may be of the ordinary Monarch construction and operated by the printing keys and the space key in the usual way; or as far as the present invention is concerned, these parts may be of any suitable construction.

Above its pivotal axis the dog rocker is formed with the usual depression 26, (Fig. 15) which receives a compression spring 27, (Fig. 1) which is the returning spring of said dog rocker. The motion of the parts under the impulse of said spring is limited by an adjustable stop screw 28, and the motion of the parts under the impulse of the link 25 is limited by another adjustable stop screw 30, said stop screws being arranged to strike the bracket 23.

The escapement comprises three feed dogs, two of which are movably mounted on the dog rocker and the third one of which is rigidly mounted thereon, and one of said feed dogs is capable of being set to operative or to inoperative position. The dog rocker has an upstanding arm or standard 31 which carries the three feed dogs. The two movable dogs consist of a normally engaged dog 32 and a normally disengaged dog 33, which are pivoted on shouldered and headed screws 34 and 35, respectively, said screws being threaded into the left-hand face of the standard 31 and passing through long barrel-like hubs 36 and 37 of the feed dogs and threaded respectively into holes 38 and 40, (Fig. 5) in the dog rocker. The pivot screws 34 have their axes parallel to the axis of the dog rocker 20 so that said dogs are adapted to rock about their pivots toward the front or toward the back of the machine. Said dogs are controlled by springs 41 and 42 each of which is coiled about the hub of the associated dog and is connected at one end to the dog and at the other end to the pivot screw, each as here shown, being inserted in a hole 43, (Fig. 11) in the head of the screw. The spring 41 tends to move the dog 32 toward the rear and the spring 42 tends to move the dog 33 toward the front, the motion of both dogs being limited by any suitable means. As shown in the present instance this limiting means consists of a part of the rigid dog, to be presently described.

As shown in Figs. 14–25, the dog 33 has a lead over the dog 32, that is to say, it has its engaging face a little to the left of the dog 32. The parts stand normally in the positions shown in Fig. 16. When a key is depressed the arm 31 of the dog rocker moves toward the front of the machine until the dog 33 abuts the rear side of one of the rack teeth 44 when this dog is arrested by said tooth; and as the dog rocker continues its motion said dog 33 is compelled to rock about its pivot screw 35 against the tension of its spring 42. When the parts reach the position shown in Fig. 17, the dog 32 is out of engagement with the tooth $a$ of the escapement wheel, and said wheel immediately begins to turn. As soon as the tooth $a$ moves away from the dog 33, said dog is snapped in behind it by its spring 42 and it arrests the next succeeding tooth $b$ of the escapement wheel as shown in Fig. 18, which figure represents the parts as they stand when the key is fully depressed. On the upstroke of the key the parts return to the positions shown in Fig. 19, where the tooth $b$ is held by the dog 32. It will be seen that this gives the operation of a reverse escapement.

The rigid dog 45,—(Fig. 7) consists of a tooth forming the upper part of a perpendicular bar 46 which at its lower end is bent off toward the rear to form a handle or finger piece 47. The upper part of the bar 46 is thickened as shown at 48 and this thickened part of the bar is guided in a slot 50, (Fig. 5) formed in the upper part of the standard 31 of the dog rocker. As shown in Fig. 7, the tooth 45 is offset to the rear of the main part of the bar 46. Said bar passes up between the two dogs 32 and 33, as best shown in Fig. 2, and constitutes the means which limits the motion of the dogs 32 and 33 under the impulse of their respective springs 41, 42. In Fig. 2 the tooth 45 is hidden behind the dog 33, and it is also in Fig. 1, but said tooth is shown in dotted lines in the latter figure. In order to accommodate this tooth the right-hand side of the dog 33 is milled away to make a notch 51, Fig. 16, which receives this tooth 45 as shown in Fig. 3. The dog 45 is settable up and down and when it is in its upper position, shown in Fig. 23, it is adapted to engage the escapement wheel, and when it is in its lower position, shown in Fig. 1, it is below the escapement wheel and is therefore inoperative. It is when this dog is in its lower and inoperative position that the escapement is set for a reverse feed as described above. In order to guide the dog in its up and down motion the thickened part 48 thereof is formed with a slot 52, (Figs. 7 and 23) and through said slot there passes a pin or rod 53 which is mounted in a hole 54, (Fig. 5) extending in a front and back direction through the arm 31. The lower part of the dog, that is to say, of the vertical bar 46, passes by the side of a binding screw 55 which is threaded into a hole 56, (Fig. 5) in the arm 31. Said bar 46 is separated at this point from said arm 31 by means of a washer 57, (Figs. 9 and 23) which surrounds the screw 55. The construction is such that by loosening said screw 55 the bar 46 and dog 45 can be moved up or down to operative or inoperative position and can be secured in either position by tightening said screw 55.

When the dog 45 is in its operative position, the machine is set for ordinary feed and the operation is as illustrated in Figs. 20, 21 and 22. The parts are shown in normal position in Fig. 20. When a key is depressed the escapement tooth $a$ drops from the dog 32 to the dog 45 as shown in Fig. 21 and when the key rises said dog 32 is first arrested by the front face of the tooth $a$ and as the dog rocker continues to move this dog is compelled to turn about its pivot screw 34 against the tension of its spring 41. When the tooth $a$ escapes from the dog 45 the wheel begins to turn and the dog 32 snaps in front of the next succeeding tooth $b$ and arrests it as shown in Fig. 22. In this operation, the dog 33 comes against the rear face of each tooth 44 but it never arrests said tooth. This dog is, therefore, inoperative when the escapement is set for ordinary feed. It will be seen that the dogs 33 and 45 can be rendered operative alternatively, and that one of them, when operatively, affords a reverse feed and the other when operative affords an ordinary feed.

Means are provided for regulating the extent of drop when the dog 45 is in use. To this end the rod or pin 53 is formed as shown in Fig. 6 with a reduced eccentric part 58 which is the part of said rod that lies within the slot 52; and one end of said rod is formed with a saw-cut 60 for the reception of a screw-driver. By turning the rod 53 in the hole 54 the eccentric 58 will move the dog 45 to the right or to the left. The rod 53 is secured in adjusted position by means of a set screw 61, Fig. 23. By this adjusting means the tooth 45 can be set to the left in Fig. 23 until its contact face is nearly in the same plane as that of the dog 32 or it can be set back considerable distance so as to allow of a considerable drop.

In order to allow the carriage to be drawn to the right without operating the release, the dog 32 is formed with its right-hand or reverse face beveled as shown at 62 in Figs. 24 and 25. When the escapement wheel is turned backward each tooth 44 thereof cams the dog 32 forward and the dog snaps in behind the tooth, the dog acting as a pawl in this operation. Partly to facilitate the camming forward of the dog 32 when the carriage is returned to the right, and partly to facilitate the reëntry of the dogs 32 and 33 in the operation of the escapement, each of said teeth 44 is beveled away at the back as shown in the drawings so that said teeth are approximately triangular in cross section.

The carriage release is effected by withdrawing the dog 32 from engagement with the escapement wheel as shown in Fig. 2. To this end said dog is formed with a forwardly projecting arm 63 from which projects a pin 64. Said pin is adapted to be pressed down by an arm 65 of a three-armed lever which is pivoted on a screw 66 threaded into a bracket 67, (Fig. 3) said bracket being secured by a screw 68 to the depending bracket 23. Said three-armed lever has also a forwardly directed arm 70 which terminates in a stop lug 71 adapted to contact with the under side of the top plate to limit the motion of the lever. A spring 72 is compressed between the arm 70 and the top plate and said spring holds the lever in its normal position in which it is arrested by a stop lug 73 contacting with the under side of the top plate, said stop lug being formed on the arm 65. The third arm 74 of said lever projects upward into a slot 75 formed in the top plate, and said arm 74 has pivoted thereto the rear end of a bar 76 which lies in said slot 75. Said bar has a forward projection 77 that rests on the top plate, and an upstanding lug 78. A yoke bar 80 is mounted on arms 81 in such position that when said bar 80 is moved toward the rear of the machine it pushes on the lug 78 and rocks the three-armed lever, depressing the pin 64 and withdrawing the dog 32 from the escapement wheel and thus allowing the carriage to run free of the escapement.

The bar 80 is parallel with the platen and lies below and behind said platen and the arms 81 are secured to and hang down from short rock shafts 82, Fig. 3, which rock shafts are pivoted in barrels 83 forming parts of the end pieces of the carriage. On its outer end each of the shafts 82 has rigidly mounted an arm 84 of a carriage release key 85. The rocking frame, consisting of these release keys, shafts 82, arms 81 and bar 80, is restored to normal position by springs 86 coiled about the barrels 83 and the motion of said frame is limited by stop pins 87 and 88, Fig. 1. The construction is such that when either of the release keys 85 is depressed it moves the bar 80 toward the rear of the machine and operates the release.

The release is shown in Fig. 2 in operated position but it has been moved to that position by the tabulator and not by the carriage release key. Said tabulator as shown in the present instance comprises a toothed column stop bar 90 on which is mounted one or more column stops 91 which are adapted to coöperate with a carriage stop 92 that projects from the back bar 6 of the carriage. The stops 91 normally pass above the stop 92, as indicated in Fig. 1, and they are brought into the path of said stop 92 by rocking the bar 90. To this end said bar is rotatably mounted in brackets 93 projecting from the standards 94 which support the stationary carriage rails 3, and one end of said stop bar has an arm 95 projecting therefrom toward the front of the machine and having pivoted thereto the upper end of a link 96 which passes down through a hole in the top plate and is connected at its lower end to an arm of a bell crank 97 which is pivoted to one of the rear corner posts 1 of the machine. The other arm of said bell crank has pivoted thereto the rear end of a push rod 98, the forward end of which is supported by the front corner posts 2 and carries the tabulator key 100. The link 96 is pushed upward to hold the parts in normal position, by a spring 101, Fig. 1, which is coiled about the upper part of said link and is compressed between the shoulder of said link and the top plate. The motion of the parts under the impulse of this spring, is limited by a nut 102 on the rod 98 contacting with the front corner post 1. As shown in Fig. 4, a little below the top plate the rod 96 has an arm 103 projecting therefrom into a slot in the end of a lever 104 which is pivoted at 105 in a bracket 106 depending from the top plate. The opposite end of the lever 104 lies underneath the arm 70 of the three-armed lever 65, 70, 74. The construction is such that when the key 100 is pushed toward the back of the machine to rock the column stop bar 90, the left-hand end of the lever 104 is raised, which elevates the arm 70 and depresses the arm 65 and operates the release as shown in Fig. 2.

Various changes can be made in the details of construction and arrangement without departing from my invention.

What I claim as new and desire to secure by Letters Patent, is:—

1. In the carriage escapement of a typewriting machine, the combination with an escapement rack, of three dogs, means for vibrating said dogs together relative to said rack, and means for bringing either one of two of said dogs into use, the third dog being, in all adjustments of the parts, the normally engaged dog, and the first two dogs being usable alternately as holding dogs.

2. In the carriage escapement of a typewriting machine, the combination with an escapement rack, of three dogs, means for vibrating said dogs together relative to said rack, and means for adjusting one of said dogs with relation to the others to bring said adjustable dog into or out of use.

3. In the carriage escapement of a typewriting machine, the combination with an escapement rack, a dog rocker, three dogs mounted on said dog rocker, the first of said dogs being adjustable on said dog rocker into and out of position to take the place of the second of said dogs, and the third dog being unaffected by the adjustment of the first dog and arranged to coöperate with the first dog or with the second dog to control the rack, depending on the adjustment of said first dog.

4. In the carriage escapement of a typewriting machine, the combination with an escapement rack, of a plurality of feed dogs, a support for said dogs, one of said dogs being slidably relative to the others on said support into position to coöperate with said rack and into an inoperative position, and means for retaining said slidable dog in either of said positions.

5. In the carriage escapement of a typewriting machine, the combination with an escapement rack, of a dog normally engaging said rack, two other dogs normally out of engagement with said rack, and means settable to render said two other dogs operative alternatively as holding dogs, one of said two dogs when operative affording an ordinary carriage feed, and the other when operative affording a reverse feed.

6. In the carriage escapement of a typewriting machine, the combination with an escapement rack, of a dog normally engaging said rack, a loose dog and a rigid dog, means settable to render said loose and rigid dogs operative alternatively to coöperate with said rack, and a third dog independent of said settable means.

7. In the carriage escapement of a typewriting machine, the combination with an escapement rack, of a dog normally engaging said rack, a second dog arranged to move into engagement with said rack and to afford a letter space step to said rack when the first dog moves out of engagement, and a third dog, said third dog being settable to operative or to inoperative position and arranged, when in operative position to move into engagement with the rack and to hold the rack against a letter space step when the first dog moves out of engagement with the rack, whereby the escapement gives an ordinary feed when said third dog is in its operative position and a reverse feed when it is in its inoperative position.

8. In the carriage escapement of a typewriting machine, the combination with an escapement rack, of a dog normally engaging said rack, a second dog arranged to move into engagement with said rack and to afford a letter space step to said rack when the first dog moves out of engagement, and a third dog, said third dog being settable to operative or to inoperative position and arranged, when in operative position to move into engagement with the rack and to hold the rack against a letter space step when the first dog moves out of engagement with the rack, whereby the escapement gives an ordinary feed when said third dog is in its operative position and a reverse feed when it is in its inoperative position, and means for adjusting said third dog to regulate the amount of drop afforded by said third dog.

9. In the carriage escapement of a typewriting machine, the combination with an escapement rack, of a dog having a slot therein, and a pin having an eccentric part passing through said slot, said pin being rotatively adjustable to regulate the position of said dog.

10. In the carriage escapement of a typewriting machine, the combination with an escapement rack, of a dog, means for setting said dog to either of two positions, in one of which said dog is operative and in the other of which it is inoperative, said dog having a slot, and an eccentric engaging in said slot and relatively adjustable to regulate the position of said dog.

11. In the carriage escapement of a typewriting machine, the combination with an escapement rack, of a stepping dog and a rigid dog adapted when the escapement is operated to engage said rack alternatively, said rigid dog having a slot therein, and an eccentric engaging in said slot and relatively adjustable to regulate the amount of drop afforded by said rigid dog.

12. In the carriage escapement of a typewriting machine, the combination with an escapement rack, of a dog rocker, a normally engaged dog and a normally disengaged dog, both pivotally mounted on said dog rocker, the normally disengaged dog having a lead over the normally engaged dog, and a third dog adjustable relative to the other dogs into or out of operative position, said normally engaged dog having a lead over said third dog.

13. In a typewriting machine, the combination of a carriage, a feed rack rigidly mounted on said carriage, a feed pinion permanently geared to said rack, an escapement wheel rigidly connected with said pinion, a dog rocker mounted to vibrate transversely of said wheel, feed dogs mounted on said dog rocker and including a normally engaged dog which is pivoted on said dog rocker eccentrically of said dog rocker, and carriage release mechanism including an arm on said normally engaged dog, a lever on the frame work arranged to move transversely of the line in which said arm is moved by the vibration of said dog rocker, and means for operating said lever.

14. In a typewriting machine, the combination of a carriage, a feed rack rigidly mounted on said carriage, a feed pinion permanently geared to said rack, an escapement wheel rigidly connected with said pinion, a dog rocker mounted to vibrate transversely of said wheel, feed dogs mounted on said dog rocker and including a normally engaged dog which is pivoted on said dog rocker eccentrically of said dog rocker, and carriage release mechanism including an arm on said normally engaged dog, a lever on the frame work arranged to move transversely of the line in which said arm is moved by the vibration of said dog rocker, and means for operating said lever, and said normally engaged dog being beveled on its reverse side to allow said escapement wheel to turn backward.

15. In a typewriting machine, the combination of a power driven carriage, an escapement rack, a dog rocker arranged to vibrate transversely of said rack, two dogs mounted on said dog rocker, one of said dogs being normally engaged with said rack and being movable independently of said dog rocker and having an arm, a disengaging device mounted on the frame work adjacent said arm and movable transversely to the line in which said arm is moved by the vibration of the dog rocker, a release key on said carriage, and connections from said key for operating said disengaging device to withdraw said normally engaged dog from the rack, and tabulator mechanism including means for operating said disengaging device to release the carriage.

16. In a typewriting machine, the combination of a carriage, an escapement rack, a dog rocker, feed dogs including a normally engaged dog pivotally mounted on said rocker, a lever mounted on the stationary framework and adapted to engage said pivotally mounted dog to withdraw it from engagement with said rack, a key operated bail on said carriage for operating said lever, and tabulator mechanism including means for operating said lever.

Signed at Syracuse, in the county of Onondaga and State of New York this 28th day of February A. D. 1910.

HERBERT H. STEELE.

Witnesses:
ANNA T. LYNCH,
BESSIE G. KITTELL.

---

Copies of this patent may be obtained for five cents each, by addressing the "Commissioner of Patents, Washington, D. C."